US008562073B2

(12) United States Patent
Niitsuma et al.

(10) Patent No.: US 8,562,073 B2
(45) Date of Patent: Oct. 22, 2013

(54) VEHICLE SEAT

(71) Applicants: TS Tech Co., Ltd., Saitama (JP); Honda Giken Kogyo Kabushiki Kaisha, Tokyo (JP)

(72) Inventors: Kenichi Niitsuma, Tochigi-ken (JP); Hirooki Negishi, Tochigi-ken (JP); Jinichi Tanabe, Tochigi-ken (JP); Koji Uno, Saitama-ken (JP); Tatsuya Terauchi, Saitama-ken (JP); Koji Sano, Saitama-ken (JP)

(73) Assignees: TS Tech Co., Ltd., Saitama (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/680,899

(22) Filed: Nov. 19, 2012

(65) Prior Publication Data

US 2013/0076087 A1    Mar. 28, 2013

Related U.S. Application Data

(62) Division of application No. 12/065,180, filed as application No. PCT/JP2006/317147 on Aug. 30, 2006, now Pat. No. 8,313,140.

(30) Foreign Application Priority Data

Aug. 30, 2005  (JP) .................................. 2005-250176
Aug. 30, 2005  (JP) .................................. 2005-250177
Aug. 30, 2005  (JP) .................................. 2005-250178

(51) Int. Cl.
*B60N 2/42*    (2006.01)

(52) U.S. Cl.
USPC .................................... 297/216.12; 297/284.4

(58) Field of Classification Search
USPC ............... 297/216.12, 284.4, 216.13, 216.14, 297/284.9
See application file for complete search history.

(56) References Cited

U.S. PATENT DOCUMENTS

| 4,337,931 | A | * | 7/1982 | Mundell et al. | ............... 267/102 |
| 4,632,454 | A | | 12/1986 | Naert | |
| 5,022,709 | A | * | 6/1991 | Marchino | ............... 297/452.24 |
| 5,058,953 | A | * | 10/1991 | Takagi et al. | ............... 297/284.4 |
| 5,076,643 | A | | 12/1991 | Colasanti et al. | |
| 6,139,102 | A | | 10/2000 | von Möller | |

(Continued)

FOREIGN PATENT DOCUMENTS

| JP | 7-75608 A | 3/1995 |
| JP | 10-138811 A | 5/1998 |

(Continued)

*Primary Examiner* — Peter Brown
(74) *Attorney, Agent, or Firm* — Drinker Biddle & Reath LLP

(57) ABSTRACT

A backrest frame is provided with a cushion plate of one substantially square plate form positioned behind the waist from the upper part of the back of a vehicle seat occupant, movably back and forth by way of a plurality of upper and lower parallel seat springs, one end of either one of a pair of right and left seat springs of the plurality of upper and lower parallel seat springs is connected to a pair of lower link mechanisms provided rotatably on the backrest frame, and a rear end collision sensor is formed by the cushion plate between the seat springs for moving a headrest forward, and a coupling part of the other end of the seat spring is directly attached to the lower link mechanism.

40 Claims, 7 Drawing Sheets

(56) References Cited

U.S. PATENT DOCUMENTS

| | | |
|---|---|---|
| 6,250,714 B1 | 6/2001 | Nakano et al. |
| 6,260,921 B1 | 7/2001 | Chu et al. |
| 6,375,262 B1 | 4/2002 | Watanabe |
| 6,398,299 B1 | 6/2002 | Angerer et al. |
| 6,523,892 B1 | 2/2003 | Kage et al. |
| 6,568,753 B1 * | 5/2003 | Watanabe ................ 297/216.12 |
| 6,644,740 B2 * | 11/2003 | Holst et al. ................ 297/284.4 |
| 6,702,377 B2 | 3/2004 | Nakano |
| 6,783,177 B1 | 8/2004 | Nakano |
| 6,789,845 B2 | 9/2004 | Farquhar et al. |
| 6,789,846 B2 | 9/2004 | Humer et al. |
| 6,918,633 B2 | 7/2005 | Forkel et al. |
| 6,955,397 B1 | 10/2005 | Humer |
| 7,044,544 B2 | 5/2006 | Humer et al. |
| 7,052,087 B2 | 5/2006 | McMillen |
| 7,077,472 B2 | 7/2006 | Steffens, Jr. |
| 7,104,602 B2 | 9/2006 | Humer et al. |
| 7,270,374 B2 | 9/2007 | Moriggi |
| 7,393,052 B2 * | 7/2008 | Humer et al. ............ 297/216.12 |
| 7,644,987 B2 * | 1/2010 | Humer et al. ............ 297/216.12 |
| 7,731,280 B2 | 6/2010 | Niitsuma et al. |
| 2004/0245814 A1 | 12/2004 | Lee |
| 2005/0179306 A1 * | 8/2005 | White et al. ............. 297/452.33 |
| 2006/0178603 A1 * | 8/2006 | Popescu ................ 297/284.4 |
| 2009/0001785 A1 | 1/2009 | Swan et al. |
| 2009/0045658 A1 | 2/2009 | Humer et al. |

FOREIGN PATENT DOCUMENTS

| | | |
|---|---|---|
| JP | 10-138812 A | 5/1998 |
| JP | 10-138814 A | 5/1998 |
| JP | 11-034708 A | 2/1999 |
| JP | 11-192869 A | 7/1999 |
| JP | 11-206506 A | 8/1999 |
| JP | 2000-004977 A | 1/2000 |
| JP | 2000-071837 A | 3/2000 |
| JP | 2000-201769 A | 7/2000 |
| JP | 2000-210157 A | 8/2000 |
| JP | 2003-341401 A | 12/2003 |
| JP | 2004-351973 A | 12/2004 |
| JP | 2004-358207 A | 12/2004 |

* cited by examiner

VEHICLE SEAT

CROSS-REFERENCE TO RELATED APPLICATIONS

This application is a divisional application of U.S. patent application Ser. No. 12/065,180, having a §371 date of Oct. 5, 2009, which is a national stage entry of PCT Application Serial No. PCT/JP2006/317147, filed Aug. 30, 2006, which claims the benefit of Japanese Patent Application No. 2005-250176, filed Aug. 30, 2005, Japanese Patent Application No. 2005-250177, filed Aug. 30, 2005, and Japanese Patent Application No. 2005-250178, filed Aug. 30, 2005, the entire contents of which are incorporated herein by reference.

BACKGROUND

Disclosed herein is a vehicle seat provided with a headrest movable forward when an external force acts forward on a car body in the event of rear end collisions or the like.

There has been conventionally known a vehicle seat including a headrest provided in a backrest, a movable member provided in the backrest, and a transmission mechanism for coupling the headrest and the movable member operatively, wherein when a vehicle seat occupant moves backward relatively to the vehicle seat due to rear end collisions, the movable member is pushed by the vehicle seat occupant and moves backward, and this backward movement of the movable member moves the headrest forward by way of the transmission mechanism.

Patent Document 1: Japanese Patent Application Laid-Open No. 10-119619

SUMMARY

The prior art had a problem in the configuration of coupling the movable member to the transmission mechanism.

It is hence an object to provide a vehicle seat capable of curtailing the number of components and reducing the manufacturing cost, while maintaining a favorable comfort of sitting, by improving the coupling configuration of the movable member and the transmission mechanism.

DETAILED DESCRIPTION

Figure 1:
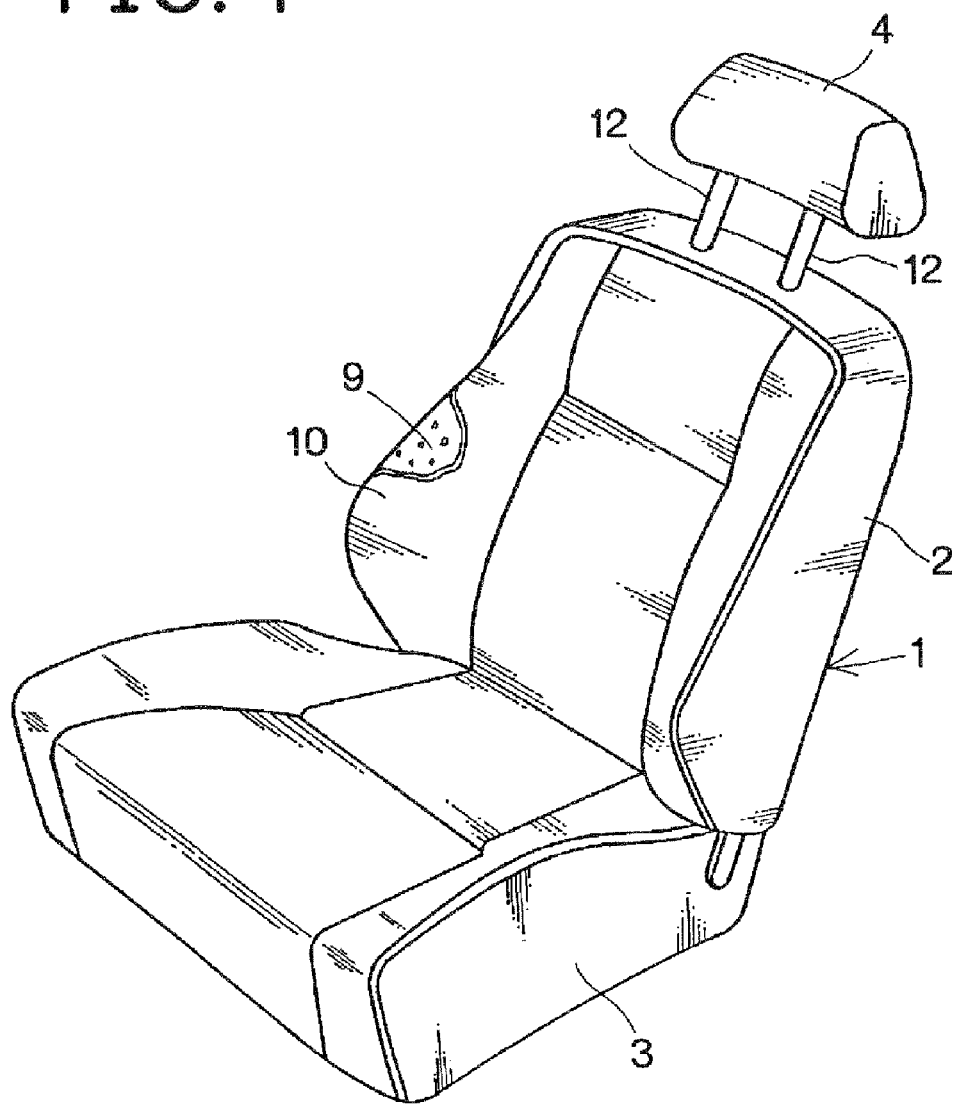
FIG. 1 is a perspective view of a vehicle seat.
Figure 2:
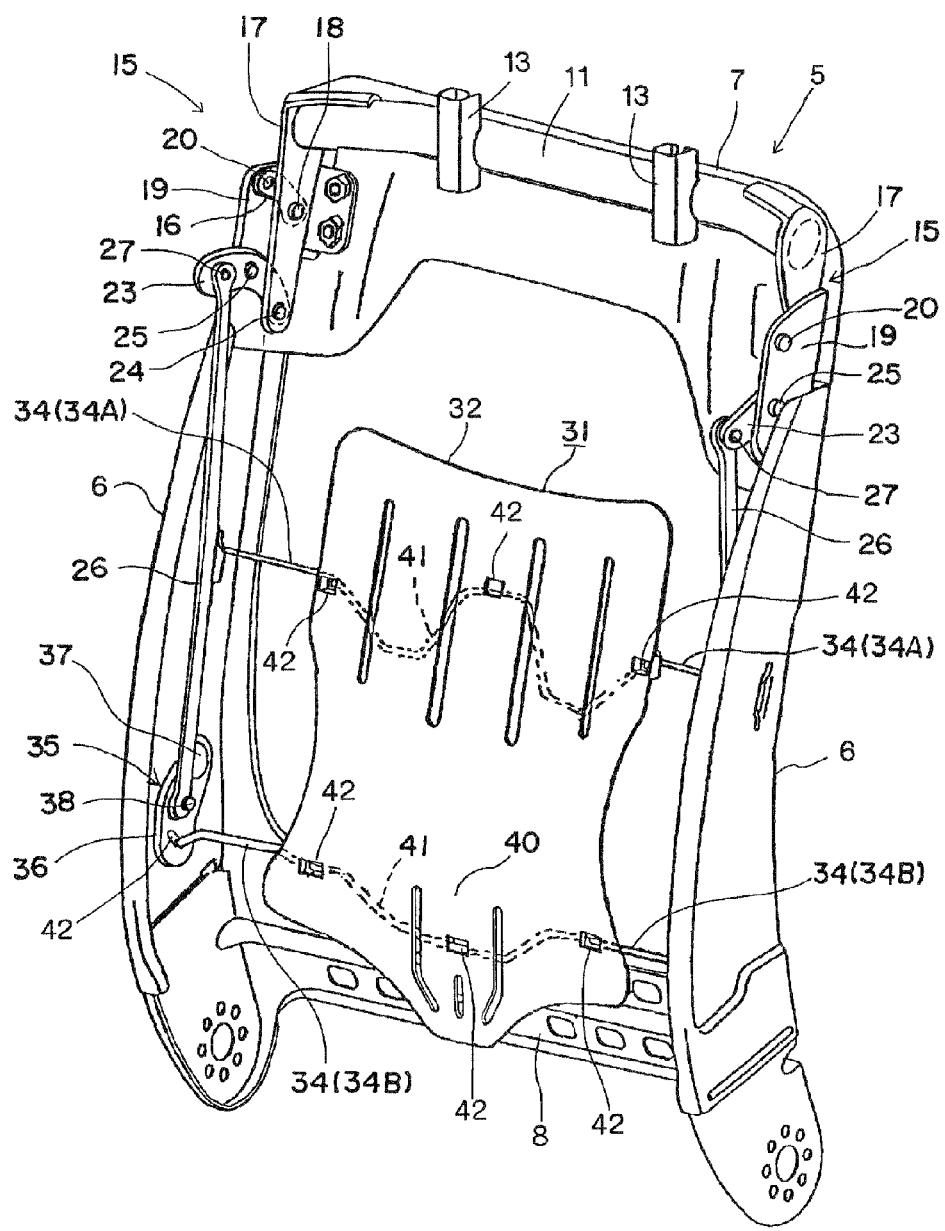
FIG. 2 is a perspective view of a backrest frame of the vehicle seat.

An exemplary embodiment of the invention will be explained by referring to the accompanying drawings, in which a vehicle seat 1 of an embodiment of the invention has a backrest 2, a seat bottom 3, and a headrest 4 provided in the upper part of the backrest 2. A backrest frame 5 of the backrest 2 has a pair of side frames 6, an upper frame 7, and a lower frame 8, and is formed in a square frame shape. The backrest frame 5 is provided with a cushion 9, and the front side of the cushion 9 is covered with an upholstery member 10. The cushion 9 may comprise a concave portion 9a and a (recessed) clearance portion 9b.

Near the upper frame 7, a headrest support part 11 which is movable against the backrest frame 5 and is extendable laterally is disposed. The support part 11 is provided with longitudinal engaging parts 13 in which the lower parts of pillars 12 of the headrest 4 are inserted. The headrest 4 is supported to be adjustable freely in height by way of the pillars 12 and the longitudinal engaging parts 13.

In the upper part of each side frame 6 (or the both sides of the upper frame 7), an L-shaped bracket 19 is fixed individually, and each bracket 19 is provided with an upper link mechanism 15. Each upper link mechanism 15 has a longitudinal link 17, a wide rotary arm 23, and a guide arm 16. The guide arm 16 is rotatably pivoted on the bracket 19 by way of a shaft 20, and the rotary arm 23 is rotatably pivoted on the bracket 19 by way of a shaft 25. The leading end of the guide arm 16 is pivoted on the middle part in vertical direction of the longitudinal link 17 by way of a pin 18, and the leading end of the rotary arm 23 is pivoted on the lower part of the longitudinal link 17 by way of a pin 24. One end portion of the headrest support part 11 is fixed on the upper part of the longitudinal link 17. The other end portion of the rotary arm 23 is pivoted on the upper part of a long connecting rod 26 by way of a pin 27.

Figure 3:
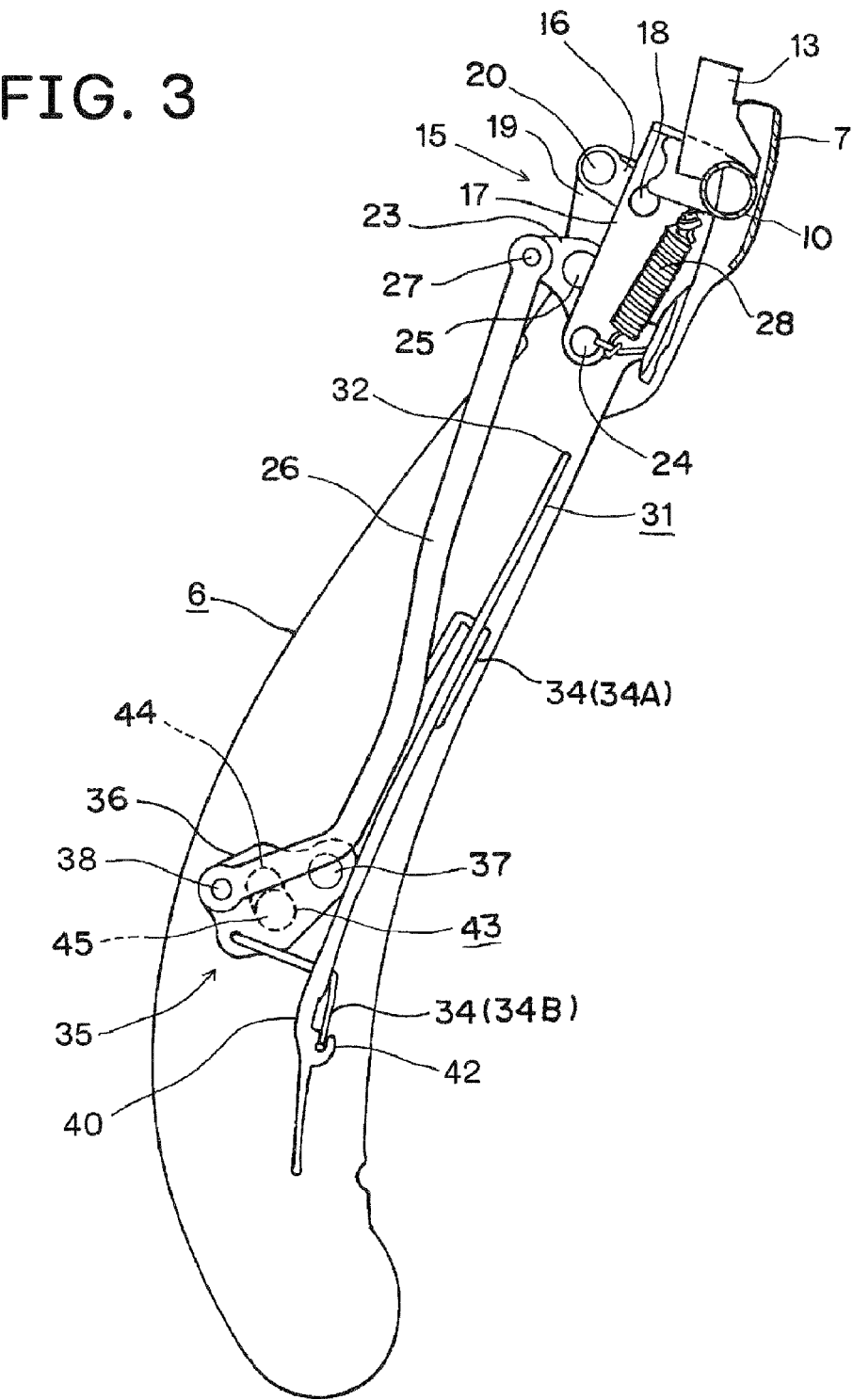
FIG. 3 is a side view of a side frame and a transmission mechanism of the backrest frame.

As shown in FIG. 3, one end of a return spring 28 is coupled to the lower part of the longitudinal link 17, and the other end of the spring 28 is coupled to the side frame 6. The longitudinal link 17 is usually held in a lower waiting position by an elastic force of the spring 28 or the like, and the headrest 4 is also held in home position. However, if the rotary arm 23 rotates counterclockwise in FIG. 3 due to a downward movement of the connecting rod 26, the upper part of the longitudinal link 17 moves upward to the front side, and thereby the headrest 4 is moved forward by way of the headrest support part 11.

A flexible cushion plate 31 (rear-end collision detector) is disposed inside the backrest frame 5. The plate 31 is preferably made of synthetic resin such as propylene, and is substantially a square single plate. The plate 31 is fitted to a seat spring 34 such as zigzag spring or formed wire spring. The seat spring 34 at least has upper and lower seat springs 34A, 34B (the lower seat spring also characterized as a connecting member or wire member) substantially extended laterally. Both ends of the upper seat spring 34A are coupled to the side frames 6, 6, and both sides of the lower seat spring 34B are coupled at an outer end 34B.1 to a lower link mechanism 35 (rotary member/link member) provided in each side frame 6, the lower seat spring 34B comprising a forward bent portion 34B.2. The seat cushion 9 is provided ahead of the plate 31. The side frames 6 may also comprise a front 6a and a rear 6b flange portion.

The cushion of the conventional backrest has been directly supported by multiple seat springs without interposing the cushion plate. In such conventional cushion, when a strong load is locally applied to the cushion, the seat spring moves vertically, not backward, and the cushion sinks in between two adjacent springs, possibly causing a local backward movement not favorable for the vehicle seat occupant.

The cushion plate 31 solves this problem favorably. When the cushion plate 31 receives an ordinary load from a vehicle seat occupant T through the cushion 9, it is elastically deformed appropriately, and moves backward within a specified rage by resisting the elastic force of the seat spring 34. The plate 31 receives the ordinary load through the cushion 9 on its entire surface. In other words, the plate 31 transmits the elastic force of the seat spring 34 to the cushion 9 by a wide surface area. As a result, as compared with the conventional configuration in which the cushion 9 is supported only by the seat spring 34, a better comfort of sitting is presented to the vehicle seat occupant T.

An upper edge 32 of the cushion plate 31 is set at a height corresponding to the chest position of an average vehicle seat occupant T, and the lower part of the cushion plate 31 is set at a position capable of supporting the waist of the vehicle seat occupant T.

Both sides of the lower seat spring 34B are formed like a hook-shaped coupling part 39, and the coupling part 39 is engaged with an engaging hole 42 formed in a rotary arm 36 of each lower link mechanism 35. The rotary arm 36 is pivoted on the side frame 6 by way of a (support) shaft 37. The lower part of the connecting rod 26 is coupled to the rotary arm 36 by way of a pin 38.

The coupling part 39 is bent to the rear side so as to be in a lateral direction in a side view, this coupling part 39 is engaged with the engaging hole 42 of the lower link mechanism 35 in a lateral direction, and then the lower link mechanism 35 is rotatably fitted to the backrest frame 5 by way of the shaft 37 so that the engaging hole 42 may be directed longitudinally. Therefore, engagement between the coupling part 39 and the engaging hole 42 is easy, and when the lower link mechanism 35 is attached to the backrest frame 5, the coupling part 39 is not removed from the engaging hole 42.

When the vehicle seat 1 is moved forward relatively to the vehicle seat occupant T by rear end collisions, an impact load exceeding the ordinary load is applied to the cushion plate 31, thereby moving the plate 31 backward far beyond the specified range. This movement causes the rotary arm 36 to rotate counterclockwise from the dotted line position to the solid line position in FIG. 5 by way of the lower seat spring 34B, and the connecting rod 26 to move downward. As a result, the rotary arm 23 of the upper link mechanism 15 rotates counterclockwise in FIG. 3, and the upper part of the longitudinal link 17 resists the elastic force of the spring 28 to move in the forward and upward direction, thereby moving the headrest 4 forward by way of the headrest support part 11. Hence, in the event of rear end collisions, the headrest 4 protects the head (neck) of the vehicle seat occupant T, and reduces damage to the vehicle seat occupant T.

Figure 4:
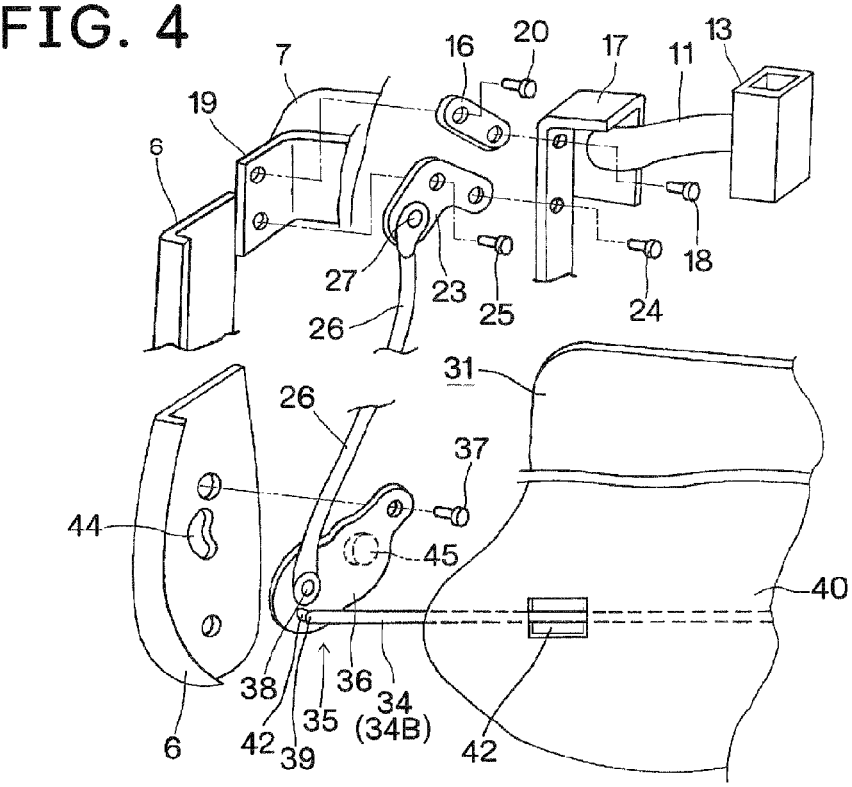
FIG. 4 is a perspective view of an upper link mechanism and a lower link mechanism of the transmission mechanism.

Therefore, the portion of attaching the lower seat spring 34B of the cushion plate 31 serves as a rear end collision sensor 40 for detecting the backward movement of the vehicle seat occupant T (FIGS. 3 and 4).

When a load larger than the load set in the return spring 28 is applied to the cushion plate 31 and the cushion plate 31 is moved backward, the lower seat spring 34B rotates the lower link mechanism 35 to move the headrest 4 forward by way of the transmission member 26 and the upper link mechanism 15, and therefore the cushion plate 31 in the portion of attaching the lower seat spring 34B serves as the rear end collision sensor 40.

In the exemplary embodiment, the cushion plate 31 is attached to the backrest frame 5 by way of a pair of upper and lower seat springs 34, the lower seat spring 34 of the upper and lower seat springs 34 is formed as the lower seat spring 34B, and the lower part of the cushion plate 31 is formed in the rear end collision sensor 40.

The rear end collision sensor 40 is formed by forming the cushion plate 31 in the backrest frame 5, forming the lower seat spring 34B in any part between the upper end and the lower end of the cushion plate 31, and attaching the lower seat spring 34B to the link (the lower link mechanism 35), and thereby a rear end collision can be detected. Near the waist of the vehicle seat occupant T, a backward moving amount is larger, and thus the rear end collision can be detected securely by rotating the lower link mechanism 35, or when the rear end collision sensor 40 is provided in an upper part, the cushion plate 31 in this portion is moved backward to a specified extent, and the support of the back of the vehicle seat occupant T may be insufficient. Therefore, by forming the rear end collision sensor 40 near the waist, support of the vehicle seat occupant T by the cushion plate 31 and reliable detection of rear end collision by the rear end collision sensor 40 are satisfied at the same time, which is preferable.

Thus, the seat spring 34 is formed of a single axial member, the middle part between the right and left ends of the seat spring 34 is formed in a bent part 41 bent properly in vertical direction, and a specified portion of the bent part 41 is attached to the rear end of the cushion plate 31 by arbitrary means. As a result, the bent part 41 supports the cushion plate 31 in a flat state, and the support of the vehicle seat occupant T by the cushion plate 31 is enhanced.

In this case, the cushion plate 31 is positioned at the rear side from the front edge of the side frame 6 of the backrest frame 5, and the middle part of the seat spring 34 (including the lower seat spring 34B) is positioned at the rear side of the cushion plate 31, but in a plan view, the coupling part 39 of the seat spring 34 projects forward, and the leading end of the coupling part 39 is provided in the side frame 6 or lower link mechanism 35, so that the front-back width of the cushion 9 is maintained and the comfort of sitting is improved.

Figure 5:
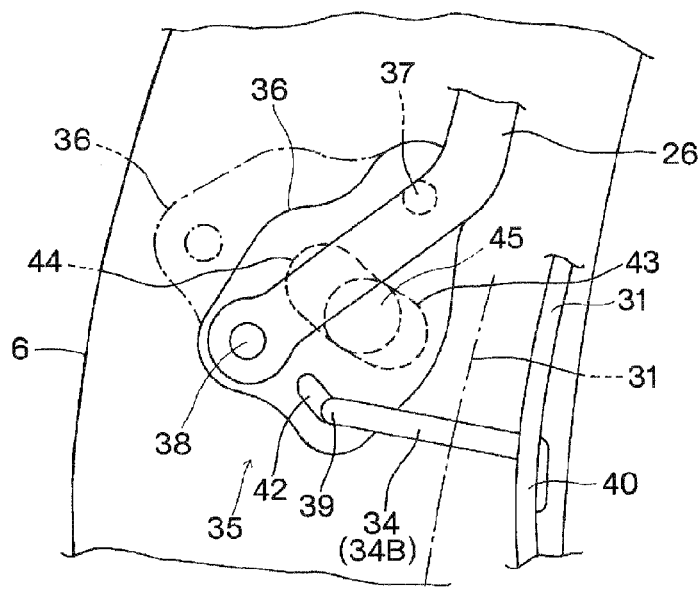
FIG. 5 is a side view of the lower link mechanism.
Figure 6:
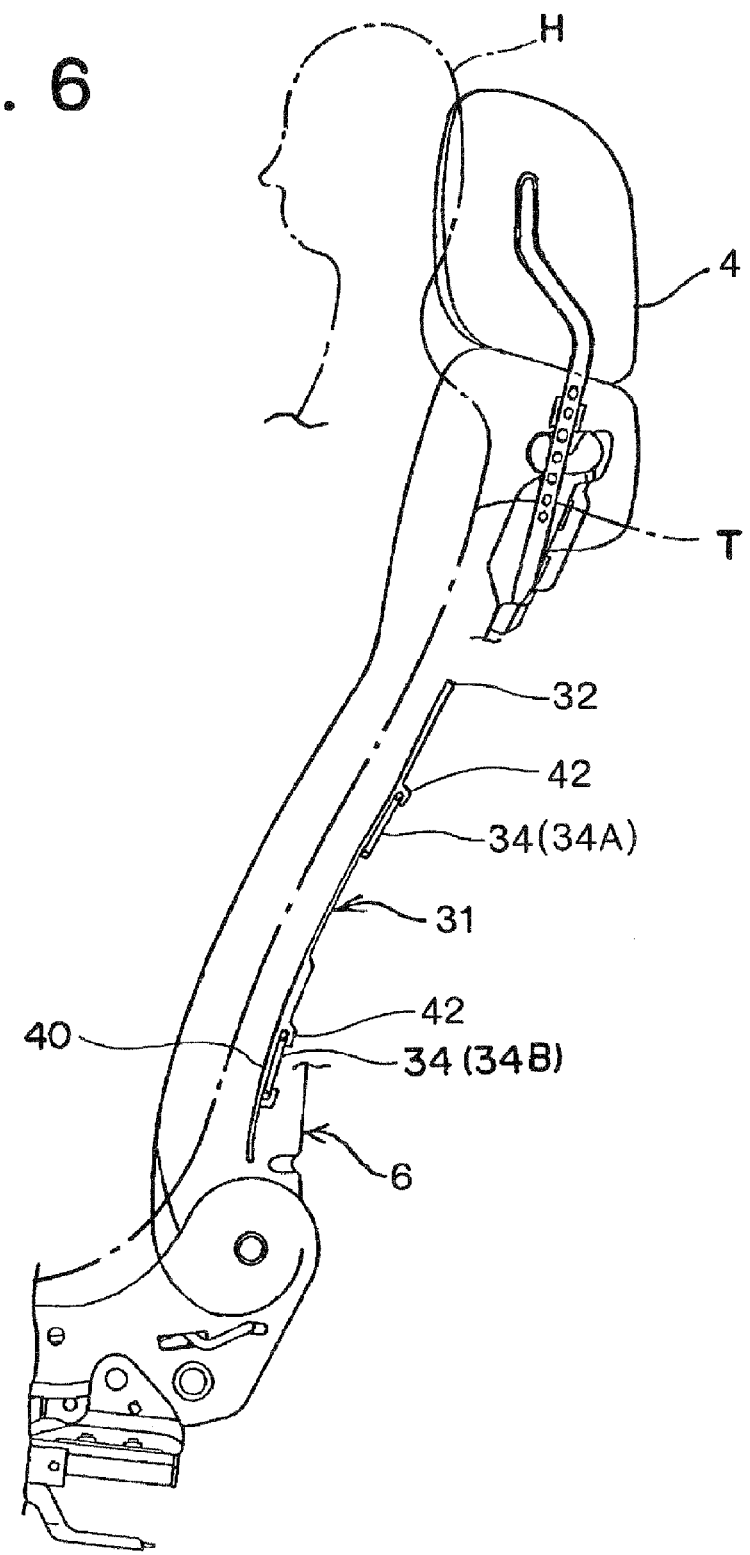
FIG. 6 is a side view showing the relation between the skeleton of a vehicle seat occupant and a cushion plate.
Figure 7:
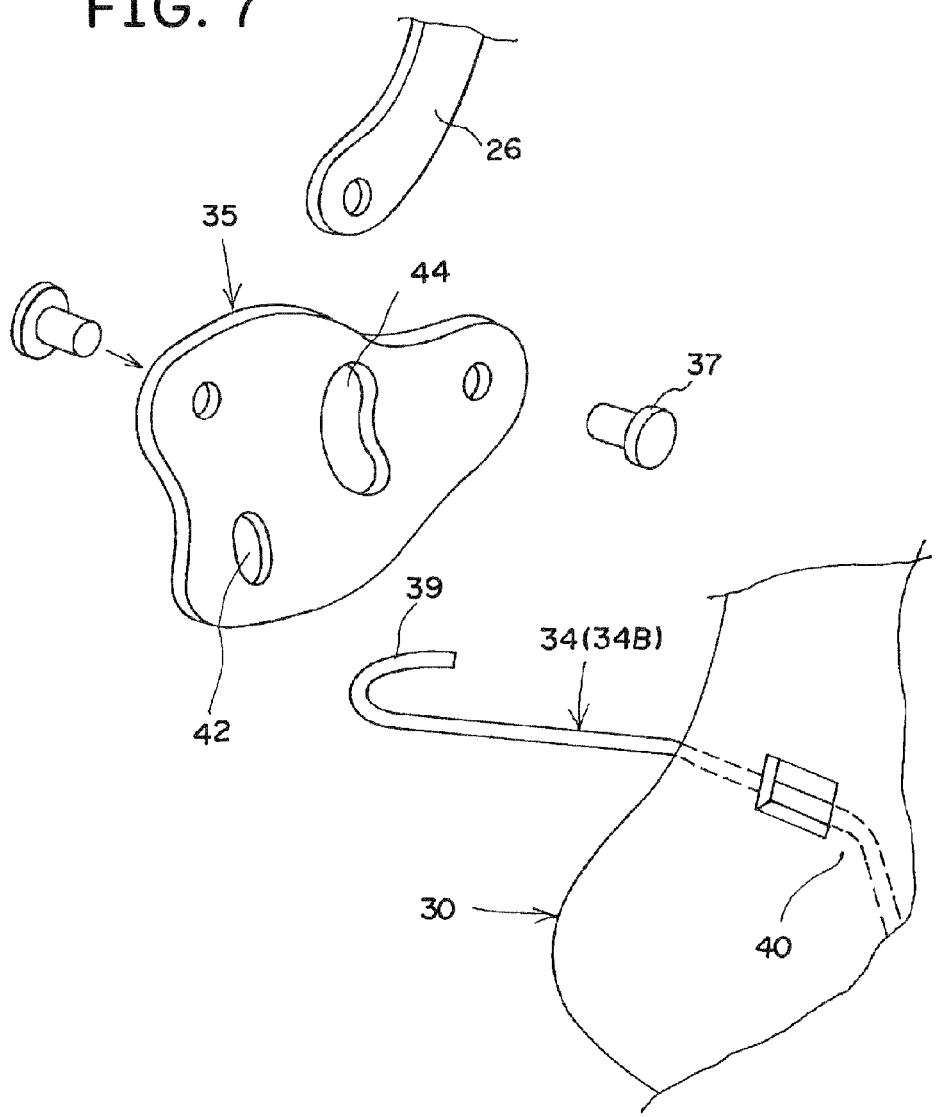
FIG. 7 is a perspective view showing a coupling configuration of a movable member (cushion plate) and the transmission mechanism.
Figure 8:
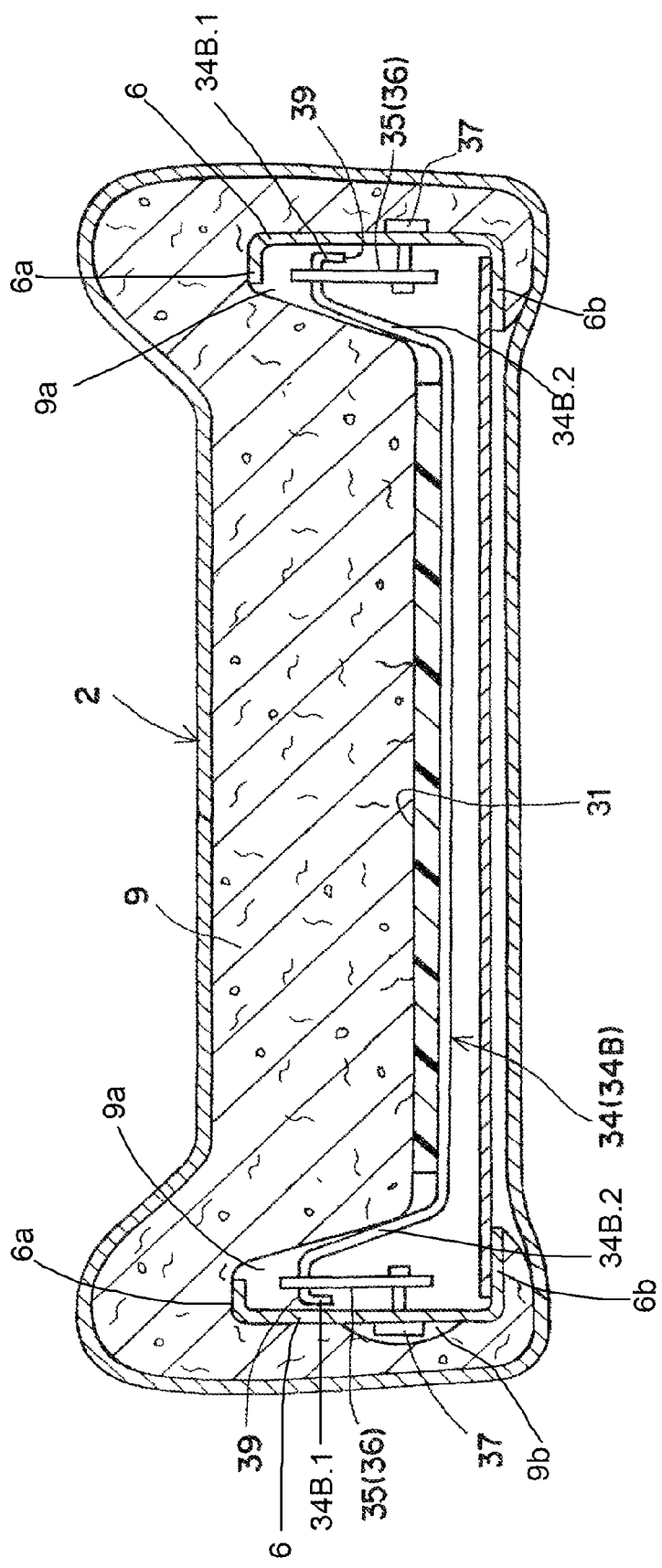
FIG. 8 is a top cross-sectional view of a backrest of the vehicle seat.

The rotary arm 36 of the lower link mechanism 35 is provided with a stopper mechanism 43 for defining the rotation of the rotary arm 36 (FIG. 5). The stopper mechanism 43 is composed by forming a guide groove 44 in either one of the rotary arm 36 and the backrest frame 5, and forming an engaging member 45 to be engaged with the guide groove 44 in the other one of the rotary arm 36 and the backrest frame 5.

In the exemplary embodiment, the guide groove 44 is formed in the rotary arm 36 of the backrest frame 5, the engaging member 45 of a pin shape fixed to the rotary arm 36 is engaged with the guide groove 44, and usually the engaging member 45 is engaged with the lower edge of the guide groove 44, so that the backward movement of the headrest 4 by the return spring 28 is stopped at a specified position.

Action of the Exemplary Embodiment

The backrest frame 5 of the backrest 2 is provided with the cushion plate 31, and the cushion plate 31 is one plate of nearly square shape and is attached to the backrest frame 5 to be freely movable back and forth by way of the seat spring 34. Therefore, when the vehicle seat occupant T sits, the cushion plate 31 elastically moves directly backward and supports the occupant, and when the vehicle is driven, the cushion plate 31 moves back and forth and supports the backrest frame 5 by its surface.

Accordingly, as compared with the conventional zigzag spring configuration for supporting by line by disposing vertically in parallel, the comfort of sitting is improved outstandingly. Since the cushion plate 31 is one plate of nearly square shape, if the load is applied only to a specified area of the cushion plate 31, the cushion plate 31 entirely moves backward, and the load is dispersed laterally and vertically to be supported securely.

Since the seat spring 34 has at least an upper seat spring 34A and a lower seat spring 34 (34B) disposed in parallel vertically, the cushion plate 31 of one flat plate is supported at least at four positions vertically and laterally by the upper seat sprig 34A and the lower seat spring 34 (34B), and the vehicle seat occupant T is supported on a flat surface.

The upper seat spring 34A of the seat spring 34 fixes the right and left ends to the backrest frame 5, and its middle part is formed in the bent part 41 properly bent in vertical direction, and therefore by the bent part 41, position deviation of the cushion plate 31 and seat spring 34 is prevented, and the cushion plate 31 supports the load on a flat surface.

The backrest frame 5 is provided with a rear end collision sensor 40 which moves backward by the backward movement of the vehicle seat occupant T collided from the rear end, and is also provided with a transmission member 26 for transmitting the backward movement of the rear end collision sensor 40, and the upper end of the transmission member 26 is attached to the rotary arm 23 of the upper link mechanism 15. Thus, the transmission member 26 is pulled downward by the backward movement of the rear end collision sensor 40, the transmission member 26 rotates the rotary arm 23 of the upper link mechanism 15 downward about the shaft 25, the rotary arm 23 pushes up the pin 24 obliquely, the pin 24 pushes up the link 17, and the link 17 pushes up obliquely forward the headrest support part 11 mounting the longitudinal engaging part 13 for supporting the pillar 12 of the headrest 4, and thereby the headrest 4 moves forward. Therefore, the headrest 4 is rotated forward by the upper link mechanism 15, and supports the head H, thereby preventing whiplash.

Any one of the plurality of parallel seat springs 34 arranged vertically is attached to the leading end of the rotary arm 36 of the lower link mechanism 35 to form a lower seat spring 34B, and the cushion plate 31 between the lower seat springs 34B is formed on the rear end collision sensor 40. Therefore, when the cushion plate 31 is moved backward more than specified by the backward movement of the vehicle seat occupant T, the lower seat spring 34B moves backward to rotate the lower link mechanism 35 downward by resisting the return spring 28, the lower link mechanism 35 rotates the upper link mechanism 15 by way of the transmission member 26, and the upper link mechanism 15 moves the headrest 4 forward, thereby supporting the head H of the vehicle seat occupant T.

Therefore, since the cushion plate 31 in the attaching portion of the lower seat spring 34B is formed in the rear end collision sensor 40 which is moved backward by backward movement of the vehicle seat occupant T collided from the rear end, the backward movement of the cushion plate 31 by the backward movement of the vehicle seat occupant T is directly transmitted to the upper link mechanism 15 by way of the lower link mechanism 35 and the transmission member 26. Therefore, the transmission efficiency of the load (inertia) is excellent, and the operation is secure.

Moreover, since a part of the cushion plate 31 is used commonly as a part of the rear end collision sensing mechanism, any extra rear end collision sensing mechanism is not needed, the number of components is curtailed, the assembling process is simplified, and the weight is reduced. In this case, the seat spring 34 may be also provided beneath the rear end collision sensing spring (lower wire spring) 34B.

Usually, the lower link mechanism 35 is fixed as being biased to rotate upward constantly by the return spring 28 provided in the upper link mechanism 15. Therefore, even if the rear end collision sensor 40 is formed in the cushion plate 31 between the right and left lower seat springs 34B, as long as the load is smaller than the elastic force of the return spring 28, the lower seat spring 34B is deformed elastically, and the cushion plate 31 is moved back and forth while maintaining a flat surface.

When the cushion plate 31 is moved backward by the load over the load set by the return spring 28, the lower seat spring 34B rotates the lower link mechanism 35, and thus the rotation of the lower link mechanism 35 is transmitted to the headrest 4 by way of the transmission member 26 and the upper link mechanism 15, thereby moving the headrest forward.

In this case, a pair of upper and lower seat springs 34 is provided in the cushion plate 31, but since the lower seat spring 34 of the upper and lower seat springs 34 is used as the lower seat spring 34B, and the lower part of the cushion plate 31 is formed in the rear end collision sensor 40, the vicinity of the waist of the vehicle seat occupant greater in the backward moving amount is formed as the rear end collision sensor 40, and the collision can be detected securely.

If the rear end collision sensor 40 is provided in the upper part of the cushion plate 31, the cushion plate 31 in this portion is moved further backward from the ordinary supporting position, and the support of the back of the vehicle seat occupant T is insufficient. However, in various embodiments of the invention, since it is formed in the lower part of the cushion plate 31, the back of the vehicle seat occupant T is supported favorably.

That is, in the zigzag spring for supporting by "line," even if the head H is supported by the headrest 4 moving forward in the event of rear end collision, the support of the back of the vehicle seat occupant T is unstable, and the positional relation between the head H and the back may be worsened. However, in various embodiments of the invention, since the entire back of the vehicle seat occupant T is supported by "surface" by the cushion plate 31, together with the headrest 4 moving forward, the head H and the back of the vehicle seat occupant T can be supported favorably, and the sitting posture of the vehicle seat occupant T including the head H can be stabilized very favorably.

Besides, since the upper edge of the cushion plate 31 is positioned behind the chest of the average vehicle seat occupant T, the chest area not changed in the sitting position is securely supported by the cushion plate 31, and the headrest 4 can be moved forward, so that the head H can be supported favorably without much changing the positional relation between the head H and the back (chest).

By the inertia of rear end collision, the cushion plate 31 moves backward, and thus it is no problem if the rear end collision sensor 40 is provided in the cushion plate 31. The support of the vehicle seat occupant T by the cushion plate 31 and the accuracy of detection of rear end collision by the rear end collision sensor 40 can be satisfied at the same time, and an extremely rational configuration is realized.

The lower seat spring 34 of the plurality of parallel seat springs 34 is used as the lower seat spring 34B, the lower part of the cushion plate 31 is formed in the rear end collision sensor 40, the engaging part coupling part 39 is formed at the leading end of each coupling part 39 of the lower seat spring 34B, and the engaging hole 42 is formed at the leading end of the rotary arm 36 of the lower link mechanism 35. Therefore, the coupling part 39 of the lower seat spring 34B can be directly attached to the leading end of the rotary arm 36, any special part for mounting is not needed, and the weight is lowered and the cost is saved.

The coupling part 39 of the lower seat spring 34B is fitted only by engaging with the engaging hole 42 at the leading end of the rotary arm 36, and the mounting work is simplified. The coupling part 39 is formed by being bent backward, and the engaging hole 42 is a long slot. Thus, the engaging hole 42 is in intersecting direction to the moving direction of the coupling part 39, and even if the rear end collision sensor 40 of the cushion plate 31 moves back and forth, the engagement of the coupling part 39 with the engaging hole 42 is not cleared.

The middle part of the seat spring 34 (including the lower seat spring 34B) is positioned at the rear side of the cushion plate 31, and in a plan view, the coupling part 39 of the seat spring 34 projects forward from the cushion plate 31, and the leading end of the coupling part 39 is attached to the side frame 6 or the lower link mechanism 35. Thus, a specified space is maintained ahead of the cushion plate 31, so that the front-back width of the cushion 9 is increased, and the comfort of sitting is enhanced.

The coupling part 39 is deformed elastically from the junction part of the coupling part 39 and the side frame 6 or lower link mechanism 35, and thus the support of the cushion 9 by the cushion plate 31 is improved, and the cushioning effect is enhanced.

The rotary arm 36 of the lower link mechanism 35 is provided with a stopper mechanism 43 for defining the rotation of the rotary arm 36, and thus together with the return spring 28 for biasing the upper link mechanism 15, the headrest 4 is always positioned at a specified position.

Usually, the engaging member 45 is engaged with the lower edge of the guide groove 44, and the backward movement of the headrest 4 by the return spring 28 is stopped at a specified position. Since the guide groove 44 of the stopper mechanism 43 and the engaging member 45 define the rotating direction of the rotary arm 36, even if the lower part of the cushion plate 31 is formed in the rear end collision sensor 40 by the seat spring 34B, the movement of the rear end collision sensor 40 is smooth, and a rear end collision can be detected securely.

A so-called lumber support mechanism for adjusting the supporting force of the cushion 9 is known, but since the lumber support mechanism is biased to always move forward to the backrest frame, the inertia by rear end collisions is supported by the lumber support mechanism, and the lumber support element does not move backward, and therefore the rear end collision cannot be detected. In this respect, since the cushion plate 31 of various embodiments of the invention is movable back and forth with respect to the backrest frame 5, the cushion plate 31 moves backward by the inertia of rear end collisions, and it is no problem if the rear end collision sensor 40 is provided in the cushion plate 31, which is quite different from the lumber support element of the lumber support mechanism.

What is claimed is:

1. A vehicle seat comprising:
a backrest frame having right and left side frames;
a headrest for supporting a head of a seat occupant that is mounted to the backrest frame;
a rear-end collision detector mounted to the backrest frame and disposed in a position behind the seat occupant, wherein the rear-end collision detector detects rearward movement of the seat occupant; and
a seat cushion provided in front of the rear-end collision detector;
wherein:
the rear-end collision detector is supported to the backrest frame via a rotary member mounted to the backrest frame and a connecting member connected to the rotary member;
the rearward movement of the rear-end collision detector moves the rotary member;
a concave portion is formed proximate an outer lateral side relative to a seating direction of the seat cushion;
an end portion of the connecting member is accommodated in the concave portion;
the end portion of the connecting member is provided with a forward bent portion that is bent forward along the concave portion of the seat cushion; and
at least a part of the forward bent portion contacts a surface of the concave portion.

2. The vehicle seat according to claim 1, wherein:
the connecting member comprises a coupling part for connecting the connecting member to the rotary member;
the coupling part includes an outer end that is bent backward; and
the rotary member is provided with an engaging hole that engages with the coupling part.

3. The vehicle seat according to claim 2, wherein the engaging hole is of a long slot form that permits translational movement of the connecting member within the engaging hole.

4. The vehicle seat according to claim 1, wherein:
the connecting member comprises a coupling part for connecting the connecting member to the rotary member;
the coupling part includes an outer end that is bent backward;
the outer end of the connecting member is disposed between the rotary member and one of the side frames;
the side frame is provided with a front flange portion and a rear flange portion extending inward respectively at a front end and a rear end of the side frame; and
the outer end of the connecting member is disposed between the front flange portion and the rear flange portion.

5. The vehicle seat according to claim 1, wherein:
the connecting member comprises a coupling part for connecting the connecting member to the rotary member;
the coupling part includes an outer end that is bent backward;
the outer end of the connecting member is disposed between the rotary member and one of the side frames;
the side frame is provided with a front flange portion and a rear flange portion extending inward respectively at a front end and a rear end of the side frame;
the outer end of the connecting member is disposed between the front flange portion and the rear flange portion; and
the front flange portion, the rear flange portion and the outer end of the connecting member are disposed in a same plane parallel to a side surface of the side frame.

6. The vehicle seat according to claim 1, wherein:
the contacting of the surface of the concave portion occurs in a state where the seat occupant is not seated.

7. The vehicle seat according to claim 1, further comprising:
a support shaft that supports the rotary member on one of the side frames;
wherein:
an outer end and an inner end of the support shaft are accommodated in the concave portion of the seat cushion.

8. The vehicle seat according to claim 1, further comprising:
a support shaft that supports the rotary member on one of the side frames;
wherein:
an inner end of the support shaft is accommodated in the concave portion of the seat cushion.

9. The vehicle seat according to claim 1, further comprising:
a support shaft that supports the rotary member on one of the side frames;

wherein:
the seat cushion is provided with a clearance portion in a position that faces an outer end of the support shaft and is located between the concave portion and the outer lateral side of the seat cushion.

10. The vehicle seat according to claim 9, wherein the clearance portion comprises an outward recessed portion that is recessed outward.

11. The vehicle seat according to claim 1, wherein a central part of the connecting member comprises a bent portion that bends in a vertical direction relative to a seating direction and supports the rear-end collision detector.

12. The vehicle seat according to claim 1, further comprising:
an additional connecting member that supports the rear-end collision detector in a different position than the connecting member;
wherein:
the additional connecting member is attached to the backrest frame.

13. The vehicle seat according to claim 1, wherein:
the connecting member comprises a coupling part for connecting the connecting member to the rotary member;
the coupling part includes an outer end that is bent backward;
the rotary member is provided with an engaging hole that engages with the coupling part; and
the outer end of the connecting member is disposed in a position anterior to a support shaft that supports the rotary member on one of the side frames.

14. A vehicle seat comprising:
a backrest frame having right and left side frames;
a headrest for supporting a head of a seat occupant that is mounted to the backrest frame;
a rear-end collision detector mounted to the backrest frame and disposed in a position behind the seat occupant, wherein the rear-end collision detector detects rearward movement of the seat occupant;
a seat cushion provided in front of the rear-end collision detector; and
a support shaft that supports a rotary member on one of the side frames;
wherein:
the rear-end collision detector is supported to the backrest frame via the rotary member mounted to the backrest frame and a connecting member connected to the rotary member;
the rearward movement of the rear-end collision detector moves the rotary member;
a concave portion is formed proximate an outer lateral side relative to a seating direction of the seat cushion;
an end portion of the connecting member is bent forward along the concave portion and accommodated in the concave portion; and
the seat cushion is provided with a recessed clearance portion in a position that faces an outer end of the support shaft and is located between the concave portion and the outer lateral side of the seat cushion.

15. The vehicle seat according to claim 14, wherein:
the connecting member comprises a coupling part for connecting the connecting member to the rotary member;
the coupling part includes an outer end that is bent backward; and
the rotary member is provided with an engaging hole that engages with the coupling part.

16. The vehicle seat according to claim 14, wherein:
the connecting member comprises a coupling part for connecting the connecting member to the rotary member;
the coupling part includes an outer end that is bent backward;
the outer end of the connecting member is disposed between the rotary member and one of the side frames;
the side frame is provided with a front flange portion and a rear flange portion extending inward respectively at a front end and a rear end of the side frame;
the outer end of the connecting member is disposed between the front flange portion and the rear flange portion; and
the front flange portion, the rear flange portion and the outer end of the connecting member are disposed in a same plane parallel to a side surface of the side frame.

17. The vehicle seat according to claim 14, wherein:
the end portion of the connecting member is provided with a forward bent portion that is bent forward along the concave portion of the seat cushion; and
at least a part of the forward bent portion contacts a surface of the concave portion in a state where the seat occupant is not seated.

18. The vehicle seat according to claim 14, wherein:
an inner end of the support shaft is accommodated in the concave portion of the seat cushion.

19. The vehicle seat according to claim 14, wherein:
the connecting member comprises a coupling part for connecting the connecting member to the rotary member;
the coupling part includes an outer end that is bent backward;
the rotary member is provided with an engaging hole that engages with the coupling part; and
the outer end of the connecting member is disposed in a position anterior to the support shaft that supports the rotary member.

20. A vehicle seat comprising:
a backrest frame having right and left side frames;
a headrest for supporting a head of a seat occupant that is mounted to the backrest frame;
a rear-end collision detector mounted to the backrest frame and disposed in a position behind the seat occupant, wherein the rear-end collision detector detects rearward movement of the seat occupant; and
a seat cushion provided in front of the rear-end collision detector;
wherein:
the rear-end collision detector is supported to the backrest frame via link members and a wire member, the link members being mounted to the backrest frame and each end portion of the wire member is connected to a respective one of the link members;
a central part of the wire member is disposed behind the rear-end collision detector;
the rearward movement of the rear-end collision detector moves the link members;
concave portions are formed proximate respective outer lateral sides relative to a seating direction of the seat cushion;
each of the end portions of the wire member is provided with a respective forward bent portion that is bent forward along a respective one of the concave portions of the seat cushion, and is accommodated in the respective one of the concave portions; and
at least a part of each of the forward bent portion contacts a surface of each of the respective concave portions in a state where the seat occupant is not seated.

21. The vehicle seat according to claim 20, wherein:
the wire member comprises coupling parts for connecting the wire member to the link members;
the coupling parts each include an outer end that is bent backward; and
the link members are each provided with an engaging hole that engages with the respective coupling part.

22. The vehicle seat according to claim 20, wherein:
the wire member comprises coupling parts for connecting the wire member to the link members;
the coupling parts each include an outer end that is bent backward;
each of the outer ends of the wire member is disposed between a respective one the link members and a respective one of the side frames;
each of the side frames is provided with a front flange portion and a rear flange portion extending inward respectively at a front end and a rear end of the side frame;
each of the outer ends of the wire member is disposed between a respective one of the front flange portions and a respective one of the rear flange portions; and
one of the outer ends of the wire member is disposed in a same plane as the respective front flange portion and the respective rear flange portion, wherein the same plane is parallel to a side surface of the side frame.

23. The vehicle seat according to claim 20, further comprising:
support shafts each of which supports a respective one of the link members on one of the side frames;
wherein:
an inner end of each of the support shafts is accommodated in a respective one of the concave portions of the seat cushion.

24. The vehicle seat according to claim 20, further comprising:
support shafts each of which supports a respective one of the link members on one of the side frames;
wherein:
the seat cushion is provided with a recessed clearance portion in a position that faces an outer end of at least one of the support shafts and is located between the concave portion and the outer lateral side of the seat cushion.

25. The vehicle seat according to claim 20, wherein:
the wire member comprises coupling parts for connecting the wire member to the link members;
the coupling parts each include an outer end that is bent backward;
each of the link members is provided with a respective engaging hole that engages with a respective one of the coupling parts; and
each of the outer ends of the wire member is disposed in a position anterior to a respective support shaft that supports a respective one of the link members on one of the side frames.

26. A vehicle seat comprising:
a backrest frame having right and left side frames;
a headrest for supporting a head of a seat occupant that is mounted to the backrest frame;
a rear-end collision detector mounted to the backrest frame and disposed in a position behind the seat occupant, wherein the rear-end collision detector detects rearward movement of the seat occupant;
a seat cushion provided in front of the rear-end collision detector; and
a support shaft that supports a rotary member on one of the side frames;
wherein:
the rear-end collision detector is supported to the backrest frame via the rotary member mounted to the backrest frame and a connecting member connected to the rotary member;
the rearward movement of the rear-end collision detector moves the rotary member;
a concave portion is formed proximate an outer lateral side relative to a seating direction of the seat cushion;
an end portion of the connecting member is accommodated in the concave portion; and
the seat cushion is provided with a clearance portion in a position that faces an outer end of the support shaft and is located between the concave portion and the outer lateral side of the seat cushion.

27. The vehicle seat according to claim 26, wherein:
the connecting member comprises a coupling part for connecting the connecting member to the rotary member;
the coupling part includes an outer end that is bent backward; and
the rotary member is provided with an engaging hole that engages with the coupling part.

28. The vehicle seat according to claim 27, wherein the engaging hole is of a long slot form that permits movement of the connecting member within the engaging hole.

29. The vehicle seat according to claim 26, wherein:
the connecting member comprises a coupling part for connecting the connecting member to the rotary member;
the coupling part includes an outer end that is bent backward;
the outer end of the connecting member is disposed between the rotary member and one of the side frames;
the side frame is provided with a front flange portion and a rear flange portion extending inward respectively at a front end and a rear end of the side frame; and
the outer end of the connecting member is disposed between the front flange portion and the rear flange portion.

30. The vehicle seat according to claim 26, wherein:
the connecting member comprises a coupling part for connecting the connecting member to the rotary member;
the coupling part includes an outer end that is bent backward;
the outer end of the connecting member is disposed between the rotary member and one of the side frames;
the side frame is provided with a front flange portion and a rear flange portion extending inward respectively at a front end and a rear end of the side frame;
the outer end of the connecting member is disposed between the front flange portion and the rear flange portion; and
the front flange portion, the rear flange portion and the outer end of the connecting member are disposed in a same plane parallel to a side surface of the side frame.

31. The vehicle seat according to claim 26, wherein:
the end portion of the connecting member is provided with a forward bent portion that is bent forward along the concave portion of the seat cushion; and
at least a part of the forward bent portion contacts a surface of the concave portion.

32. The vehicle seat according to claim 31, wherein:
the contacting of the surface of the concave portion occurs in a state where the seat occupant is not seated.

33. The vehicle seat according to claim 26, wherein:
an outer end and an inner end of the support shaft are accommodated in the concave portion of the seat cushion.

34. The vehicle seat according to claim 26, wherein:
an inner end of the support shaft is accommodated in the concave portion of the seat cushion.

35. The vehicle seat according to claim 26, wherein the clearance portion comprises an outward recessed portion that is recessed outward.

36. The vehicle seat according to claim 26, wherein a central part of the connecting member comprises a bent portion that bends in a vertical direction relative to a seating direction and supports the rear-end collision detector.

37. The vehicle seat according to claim 26, further comprising:
an additional connecting member that supports the rear-end collision detector in a different position than the connecting member;
wherein:
the additional connecting member is attached to the backrest frame.

38. The vehicle seat according to claim 26, wherein:
the connecting member comprises a coupling part for connecting the connecting member to the rotary member;
the coupling part includes an outer end that is bent backward;
the rotary member is provided with an engaging hole that engages with the coupling part; and
the outer end of the connecting member is disposed in a position anterior to a support shaft that supports the rotary member on one of the side frames.

39. A vehicle seat comprising:
a backrest frame having right and left side frames;
a headrest for supporting a head of a seat occupant that is mounted to the backrest frame;
a rear-end collision detector mounted to the backrest frame and disposed in a position behind the seat occupant, wherein the rear-end collision detector detects rearward movement of the seat occupant;
a seat cushion provided in front of the rear-end collision detector; and
wherein:
the rear-end collision detector is supported to the backrest frame via a rotary member mounted to the backrest frame and a connecting member connected to the rotary member;
the rearward movement of the rear-end collision detector moves the rotary member;
concave portions are formed proximate respective outer lateral sides relative to a seating direction of the seat cushion;
each of end portions of the connecting member is provided with a respective forward bend portion that is bent forward along a respective one of the concave portions of the seat cushion and is accommodated in the respective one of the concave portions; and
at least a part of the forward bent portion contacts a surface of the concave portion in a state where the seat occupant is not seated.

40. A vehicle seat comprising:
a backrest frame having right and left side frames;
a headrest for supporting a head of a seat occupant that is mounted to the backrest frame;
a rear-end collision detector mounted to the backrest frame and disposed in a position behind the seat occupant, wherein the rear-end collision detector detects rearward movement of the seat occupant;
a seat cushion provided in front of the rear-end collision detector; and
support shafts each of which supports a respective link member on one of the side frames;
wherein:
the rear-end collision detector is supported to the backrest frame via the respective link members and a wire member, the link members being mounted to the backrest frame and each end portion of the wire member is connected to a respective one of the link members;
a central part of the wire member is disposed behind the rear-end collision detector;
the rearward movement of the rear-end collision detector moves the link members;
a concave portion is formed proximate an outer lateral side relative to a seating direction of the seat cushion;
each of the end portions of the wire member is bent forward along the concave portion and accommodated in the concave portion; and
the seat cushion is provided with a recessed clearance portion in a position that faces an outer end of at least one of the support shafts and is located between the concave portion and the outer lateral side of the seat cushion.

* * * * *